US011747237B2

(12) United States Patent
Frewen et al.

(10) Patent No.: US 11,747,237 B2
(45) Date of Patent: *Sep. 5, 2023

(54) METHOD FOR ONLINE SERVICE POLICY TRACKING USING OPTIMAL ASSET CONTROLLER

(71) Applicant: Raytheon Technologies Corporation, Farmington, CT (US)

(72) Inventors: Thomas A. Frewen, West Hartford, CT (US); Ozgur Erdinc, Mansfield, CT (US); Hala Mostafa, Newington, CT (US); Mei Chen, Shanghai (CN); Draguna Vrabie, West Richland, WA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,749

(22) Filed: May 16, 2022

(65) Prior Publication Data

US 2022/0276128 A1    Sep. 1, 2022

Related U.S. Application Data

(63) Continuation of application No. 15/927,531, filed on Mar. 21, 2018, now Pat. No. 11,333,578.

(Continued)

(51) Int. Cl.
*G07C 5/08* (2006.01)
*G01M 15/14* (2006.01)
(Continued)

(52) U.S. Cl.
CPC ............ *G01M 15/14* (2013.01); *G06Q 10/06* (2013.01); *G06Q 10/0875* (2013.01);
(Continued)

(58) Field of Classification Search
CPC ...... G01M 15/14; G07C 5/006; G07C 5/0808
See application file for complete search history.

(56) References Cited

U.S. PATENT DOCUMENTS 7,640,145 B2    12/2009  Wegerich et al.
7,860,618 B2    12/2010  Brandstetter et al.
(Continued)

FOREIGN PATENT DOCUMENTS

WO    2014200587 A2    12/2014

OTHER PUBLICATIONS

Abhulimen Model for Risk and Reliability Analysis of Complex Production Systems: Application to FPSO/Flow-Riser System Computerand Chemical Engineering 33, 2009 pp. 1306-1321 (Year: 2009).*

(Continued)

*Primary Examiner* — Rehana Perveen
*Assistant Examiner* — Cuong V Luu
(74) *Attorney, Agent, or Firm* — CANTOR COLBURN LLP

(57) ABSTRACT

A method and system of providing customizable service for an asset. The method including generating a predictive model for each asset of a fleet, each predictive model based on an operational profile for the asset and including a probability density function associated with the operational durability of the asset, establishing a maintenance strategy associated with the asset, and combining each of the predictive models to generate a compound fleet performance model, the fleet performance model including a combined probability density function. The method also includes collecting actual asset performance and maintenance data to generate actual asset metrics, determining a fleet performance profile based on the actual asset metrics indicative of a health assessment of the fleet, comparing the predicted (Continued)

fleet performance with the actual fleet performance, and ascertaining actionable choices for managing the assets based on a deviation of the predicted and actual fleet performance.

20 Claims, 5 Drawing Sheets

Related U.S. Application Data

(60) Provisional application No. 62/560,497, filed on Sep. 19, 2017.

(51) Int. Cl.
  *G07C 5/00* (2006.01)
  *G06Q 10/0875* (2023.01)
  *G06Q 10/06* (2023.01)
  *G06Q 10/20* (2023.01)

(52) U.S. Cl.
  CPC .............. *G06Q 10/20* (2013.01); *G07C 5/006* (2013.01); *G07C 5/0808* (2013.01)

(56) References Cited

U.S. PATENT DOCUMENTS

| | | |
|---|---|---|
| 7,966,868 B1 | 6/2011 | Sonnichsen et al. |
| 8,340,948 B1 | 12/2012 | Song et al. |
| 8,443,582 B1 | 5/2013 | Phillips et al. |
| 2004/0225482 A1 | 11/2004 | Vladimirov et al. |
| 2004/0243636 A1 | 12/2004 | Hasiewicz et al. |
| 2005/0038817 A1 | 2/2005 | Huang et al. |
| 2006/0243055 A1 | 11/2006 | Sundermeyer et al. |
| 2007/0258807 A1 | 11/2007 | Brummel |
| 2009/0312956 A1* | 12/2009 | Zombo ................ F01D 5/288 374/57 |
| 2012/0152007 A1 | 6/2012 | Holmes et al. |
| 2012/0317058 A1* | 12/2012 | Abhulimen ............ G06N 20/00 706/2 |
| 2013/0024179 A1* | 1/2013 | Mazzaro ................ F01D 17/20 703/18 |
| 2014/0163936 A1* | 6/2014 | Hosking ............ G06Q 10/0635 703/2 |
| 2014/0365191 A1* | 12/2014 | Zyglowicz ............ G06Q 50/06 703/7 |
| 2017/0147722 A1 | 5/2017 | Greenwood |
| 2017/0193460 A1 | 7/2017 | Subramaniyan et al. |
| 2017/0231071 A1 | 8/2017 | Elinsenberg et al. |
| 2017/0323231 A1* | 11/2017 | Johnson ............ G06Q 10/1093 |

OTHER PUBLICATIONS

Ferson et al. Validation of Imprecise Probability Models Sandia National Laboratories, Stony Brook University, 2008 (Year: 2008).*

Nilsson et al. Maintenance Management of Wind Power Systems Using Condition Monitoring Systems—Life Cycle Cost Analysis for Two Case Studies IEEE Transactions on Energy Conversion, vol. 22, No. 1, Mar. 2007 (Year: 2007).*

Abhulimen "Model for Risk and Reliability Analysis of Complex Production Systems: Application to FPSO/flow-Riser System" Computers and Chemical Engineering 33 (2009) pp. 1306-1321.

European Search Report for Application No./Patent No. 18195564. 2-1222 dated Oct. 17, 2018; 9 pgs.

Person et al., "Validation of Imprecise Probability Models" Sandia National Laboratories, Stony Brook University (2008) pp. 1-22.

Nilsson et al., "Maintenance Management of Wind Power Systems Using Condition Monitoring Systems—Life Cycle Dost Analysis for Two Case Studies" IEEE Transactions on Energy Conversion, vol. 22, No. 1 (Mar. 2007) pp. 223-229.

* cited by examiner

Asset Level Delivery Schedules and Residual Life Curves
Individual Asset Prob. Density Fcn - OFFLINE Compounded Fleet Level Residual Life Curve
Fleet Mixture Densities Expected Number of Asset Failures
Expected Number of Failures-at Fleet Level

METHOD FOR ONLINE SERVICE POLICY TRACKING USING OPTIMAL ASSET CONTROLLER

CROSS-REFERENCE TO RELATED APPLICATIONS

This application is a continuation of U.S. application Ser. No. 15/927,531, filed Mar. 21, 2018, which claims the benefit of U.S. Provisional Application No. 62/560,497 filed Sep. 19, 2017, the contents of which are hereby incorporated by reference in their entirety.

TECHNICAL FIELD OF THE DISCLOSURE

The present disclosure relates to a maintenance and operations strategy based on predicted performance models and actual operational data, more particularly, relates to automated predictive maintenance options particularly for gas turbine engines to extend system availability, modify usage patterns, and improve product support for different parts of a business structure such as sales, leasing and the like.

BACKGROUND OF THE DISCLOSURE

Any system, especially one involving specifically engineered components and/or a complex combination of parts, is subject to anticipated/unanticipated, and potentially accelerated wear and a decrease in service life, including component failure. For example, an engine may be rendered inoperable, where a major subcomponent unexpectedly reaches the end of its service life. Other components simply deteriorate over time, e.g., brake pads on an automobile, eventually rendering them unusable. Component failure can result in significant financial loss. As such, a user of any component or system may wish to know when the component is likely to reach the end of its service life, or at least the degree of deterioration it is experiencing.

However, known models for predicting decreases in service life often are limited by techniques that require large datasets. For example, some known predictive models employ linear regression, or logarithmic regression. Component users frequently do not have a dataset large enough, i.e., sufficient numbers of parts at their end of service life that would enable the abovementioned techniques to provide reliable predictions. Often, users have only sparse datasets available to them. Accordingly, known models are unable to provide satisfactory predictability. Also, users are not able to determine with any precision the missing datasets that would improve predictability. Even where nontrivial data are available, large variability exists in the dataset, worsening predictability. Other non-linear data-driven approaches, may similarly be unable to extrapolate in time and even interpolate without having a large dataset as input.

Applied to an example regarding lease or procurement of a gas turbine engine, problems associated with distribution, allocation of resources to various requirements, and unanticipated failures of components can lead to shortages in some instances of under allocation, and idle resources in instances of over allocation. Therefore it would be desirable to be able to track actual failure levels vs predicted failures and implement corrective action preferably in a minimally invasive means.

SUMMARY OF THE DISCLOSURE

In accordance with one aspect of the present disclosure, disclosed herein is a method of providing customizable service for an asset. The method includes generating a predictive model for each asset of a fleet, each predictive model based on an operational profile for the asset and including a probability density function associated with the operational durability of the asset, establishing a maintenance strategy associated with the asset, and combining multiple assets' predictive models to generate a compound fleet performance model, the fleet performance model including a combined probability density function. The method also includes collecting actual asset performance and maintenance data to generate actual asset metrics, determining a fleet performance profile based on the actual asset metrics indicative of a health assessment of the fleet, comparing the predicted fleet performance with the actual fleet performance, and ascertaining actionable choices for managing the assets based on a deviation of the predicted and actual fleet performance.

In addition to one or more of the features described above, or as an alternative, further embodiments may include that the predictive model is based on a Weibull distribution.

In addition to one or more of the features described above, or as an alternative, further embodiments may include that the predictive model is based on at least one of delivery schedules, repair models, overhaul models, mission data.

In addition to one or more of the features described above, or as an alternative, further embodiments may include that the combining includes an integration of each probability density function associated with the fleet.

In addition to one or more of the features described above, or as an alternative, further embodiments may include that the determining includes updating the predictive models for the assets of the fleet based on the collected performance and maintenance data.

In addition to one or more of the features described above, or as an alternative, further embodiments may include that the actual asset performance and maintenance data includes at least one of actual failure data, actual repair rates associated with selected assets in the fleet.

In addition to one or more of the features described above, or as an alternative, further embodiments may include that the comparing is based on determining if an actual failure rate exceeds an expected or predicted failure rate.

In addition to one or more of the features described above, or as an alternative, further embodiments may include that the actionable choices are based on computing a deviation of fleet level actual failure data from predictions and updating the predictive models based on the deviation.

In addition to one or more of the features described above, or as an alternative, further embodiments may include that the computing is based on a Wasserstein distance.

In addition to one or more of the features described above, or as an alternative, further embodiments may include adjusting mission profiles for at least one asset based on the actual fleet performance deviation from a predicted fleet performance.

In addition to one or more of the features described above, or as an alternative, further embodiments may include adjusting a maintenance strategy for at least one asset based on an actual fleet performance deviation from a predicted fleet performance.

In addition to one or more of the features described above, or as an alternative, further embodiments may include adjusting a maintenance strategy for at least one asset based on at least one of actual fleet performance and actual asset performance.

In addition to one or more of the features described above, or as an alternative, further embodiments may include updating a predictive model associated with at least one asset of the plurality of assets based on at least one of actual fleet performance and actual asset performance.

In addition to one or more of the features described above, or as an alternative, further embodiments may include reiterating at least the generating, combining, collecting, determining, comparing, and ascertaining for a selected duration.

In addition to one or more of the features described above, or as an alternative, further embodiments may include that the selected duration corresponds to a duration of a maintenance contract.

In addition to one or more of the features described above, or as an alternative, further embodiments may include that the predictive model includes a selected look ahead time.

In addition to one or more of the features described above, or as an alternative, further embodiments may include that the selected look ahead time is less than or equal to a contract duration.

In addition to one or more of the features described above, or as an alternative, further embodiments may include generating a report indicative of at least an actual fleet performance deviation from a predicted fleet performance.

In addition to one or more of the features described above, or as an alternative, further embodiments may include that the asset is a gas turbine engine.

In addition to one or more of the features described above, or as an alternative, further embodiments may include that the asset is a component of a gas turbine engine.

Also described herein in an embodiment is a maintenance system for providing customizable service for an asset. The system includes means for generating a predictive model for each asset of a plurality of assets forming a fleet, each predictive model based on an operational profile for the asset, the predictive model including a probability density function associated with the operational durability of the asset, means for establishing a maintenance strategy associated with at least one asset associated with the fleet, the maintenance strategy including user defined metrics, means for combining each of the predictive models to generate a predicted compound fleet performance model, the fleet performance model including a combined probability density function, and means for collecting actual asset performance and maintenance data for the at least one asset of the plurality of assets to generate actual asset metrics. The system also includes means for determining a fleet performance profile based on the actual asset metrics indicative of a health assessment of the fleet, means for comparing the predicted fleet performance profile with the actual fleet performance profile, and means for ascertaining actionable choices for managing the assets based on a deviation of the predicted fleet performance profile and the actual fleet performance profile.

BRIEF DESCRIPTION OF THE DRAWINGS

The subject matter which is regarded as the disclosure is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION OF THE DISCLOSURE

Figure 1:
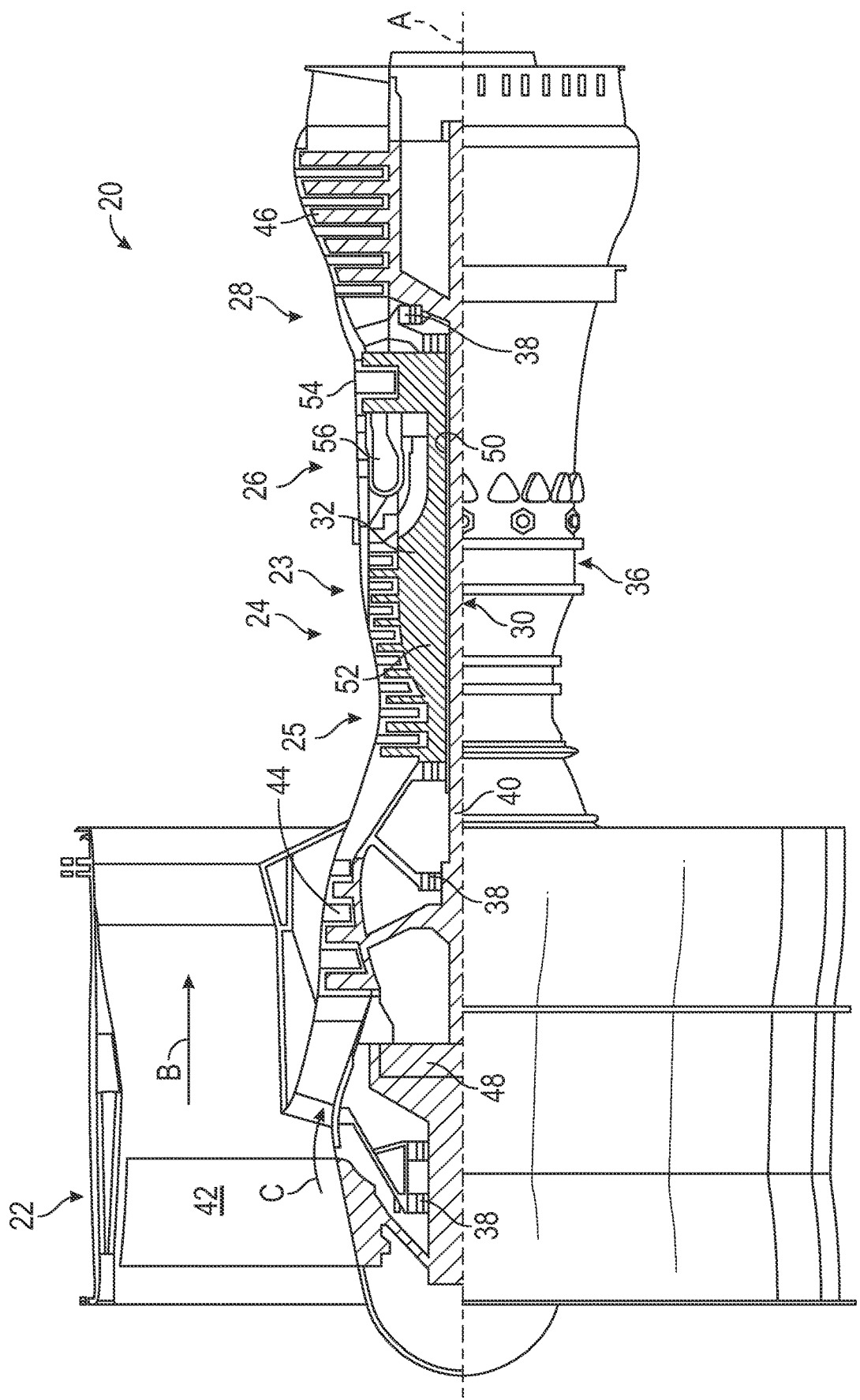
FIG. 1 depicts a simplified partial cutaway of a gas turbine engine as employed in the embodiments.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

It is desirable to provide an estimation method that classifies or quantifies and predicts engine component degradation and a method that reformulates the constrained model-based control problem with updated actuator degradation information whose solution maximizes the engine performance within selected operational constraints.

The decision focus (of a fleet manager and the methodology of the described embodiments) during service life is on adapting/tuning asset-level operating profiles to maximize fleet service health to ensure the correct/sufficient assets are available as contract demands require. This adaptation and tuning may be done in a concerted manner for assets-in-fleet (e.g. trade-offs between assets, number of assets, repairs, or swapping of assets, procurements, and the like) in response to dynamically evolving fleet health. Knowledge of sensitivities of fleet level policy to the structure of individual asset models guides the adaption of asset-level maintenance policies to track a predetermined fleet risk profile.

In general, embodiments herein relate generally to a system level approach to address the problem of distribution and allocation of gas turbine engines to customer engine fleets for the purpose of tracking an agreed-upon fleet-level risk profile during operation. In an embodiment the methodology uses stochastic gas turbine engine hot-section durabilities, engine delivery schedules, and customer priorities. Moreover, optimal engine delivery, repair, overhaul, and maintenance (collectively referred to as service) protocols are calculated to achieve a desired fleet performance using a generalized sensitivity analysis that compounds projections from individual, engine-level, remaining useful life models. Adaptation-in-time of these service protocols is accomplished by incorporating measurements of actual engine performance and maintenance data (available once entry into service has begun) and revising future projections.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine 20 in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

Figure 2:
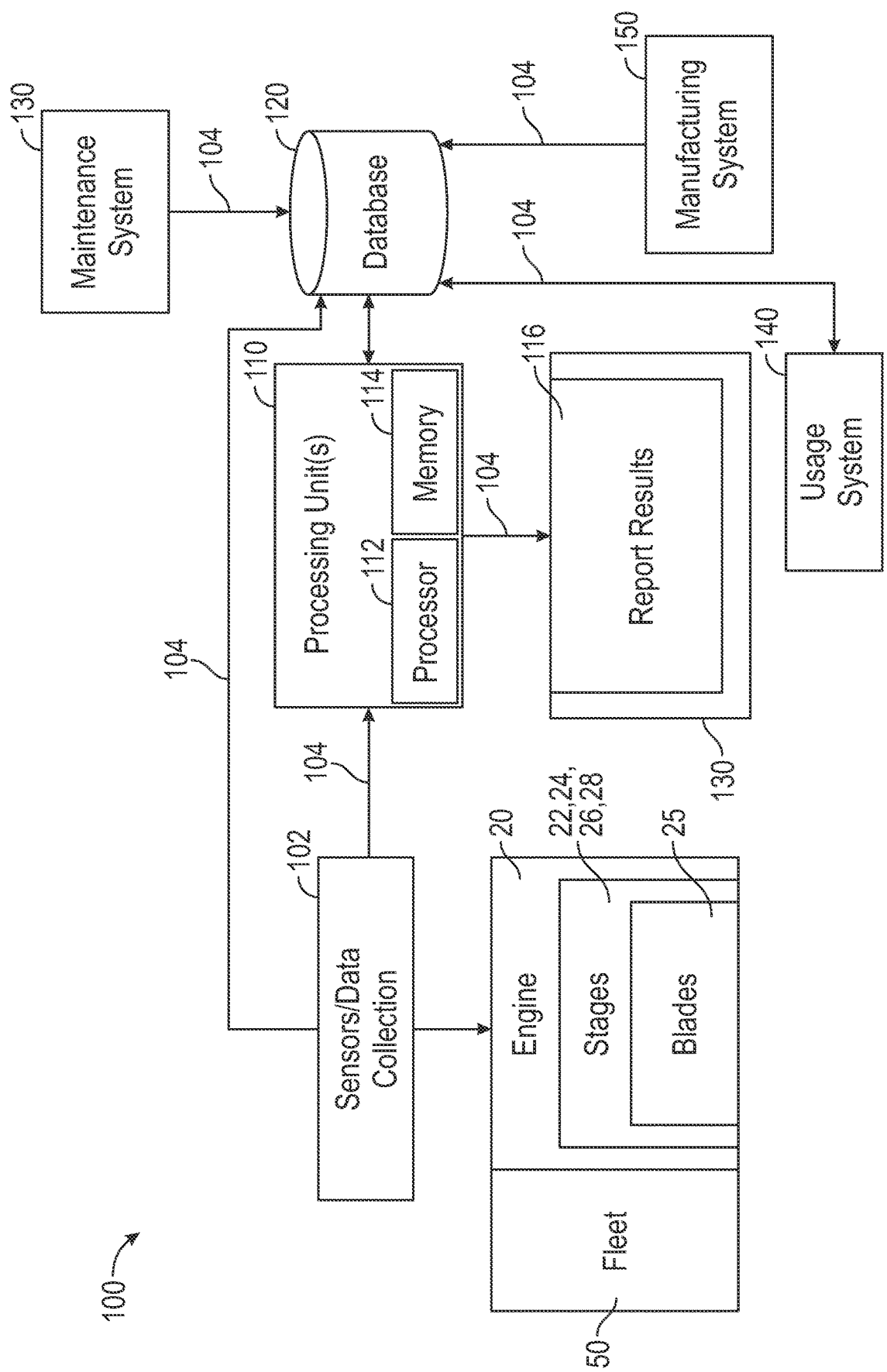
FIG. 2 is a schematic illustration of an embodiment of an automated inspection, data collection system and maintenance system, in accordance with an embodiment of the present disclosure.

Referring to FIG. 2, a schematic illustration of an automated fleet level maintenance and diagnostic system 100 is shown, in accordance with at least some embodiments of the present disclosure. In at least some embodiments, the automated fleet level maintenance and diagnostic system 2 (hereinafter system 100) may include one or more sensors or data collection systems 102 As shown, the system 100 may include a plurality of gas turbine engine(s) 20 having a plurality of sections 22, 24, 26, 28 and stages shown generally, for example, in FIG. 1 as 23 for section 24. Each of the sections 22, 24, 26, 28 and the respective stages having a plurality of blades for each stage. For example one stage of one section as depicted includes a plurality of blades shown generally as 25 for each stage, spaced on radials about the circumference of the spools 30, 32. Generally numerous components including the various sections 22, 24, 26, 28 and blades 25 may require inspection, maintenance, or replacement over time including overhaul and repair. While the embodiments herein are described with respect to a gas turbine engine 20, it should be appreciated that the engine 20 may be representative of a wide variety of engines such as jet aircraft engines, aeroderivative industrial gas turbines, steam turbines, diesel engines, automotive and truck engines, and the like. The engine 20 may be part of a plurality of engines 20 forming a fleet 50 of engines 20. In some embodiments, the fleet 50 may be just those in the same aircraft or, more generally, a large number of engines in different aircraft.

The data collection system 102 may include a variety of sensors and devices for evaluating various components of the engine 20. For example, in an embodiment the data collection system 10 may be an optical device including an optical lens or other imaging device or 2D or 3D image sensor at one end. In another embodiment, data collection system 102 may be operable in a portion of the electromagnetic spectrum not visible to the human eye such infrared or millimeter wave frequencies or may even be operable in acoustic frequencies audible or not to the human ear. Data collection system 102 may capture a single image or may capture multiple images at regular or irregular intervals. An image capture device may additionally include metrology information along with the images. Furthermore, in some embodiments the data collection system 102 may include other imaging technologies such as 3D imaging or depth sensing. In the case of a 3D image sensor, depth of the features in the article being tested is also measured. Such 3D image sensors use alternative techniques, including structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, scanning LIDAR, flash LIDAR, and the like. In an embodiment, the data collection system 102 is configured to capture and transmit data, images or videos, and the like through a communication channel 104 to a processing unit 110. In an embodiment, data collection system 10 employs an image capture device may be representative of any of a variety of flexible borescopes or fiberscopes, rigid borescopes, video borescopes or other devices such as endoscopes which are capable of capturing and transmitting images or videos of difficult-to-reach areas through the communication channel 12.

A database 120 may be in communication with the processing unit 110 via a communication channel 104. The database 120 may be a plurality of databases. The plurality of databases may be in communication with each other but remotely located from one another. In one embodiment, but not necessarily all of the embodiments, the processing unit 110 and database 120 may be remotely located and may utilize one or more remote servers that are networked to store, manage and process data, i.e. cloud computing, to allow logically centralized data storage and online access to computer services or resources.

The database 120 may store information used in processing to detect a defect in a blade 8. The information received and stored by the database 120 may include a plurality of different modes (types) of data from a plurality of different sources. For example, the modes of data may include, but are not limited to, manufacturing data, usage data, maintenance data, Image Based Defect Data (as defined herein), Multi-Modal (MM) Analysis Data (as defined herein), image or video data of the blades 25 inside the engine 20, composite data (as explained below), results, or the like. Such information may be indexed or organized by geographic location, fleet 50 model, engine 20 model, section 22, 24, 26, 28, stage e.g., 25, blade 25 model, supplier, type, duration, or environment of use or application and the like, or any other type of appropriate indexing.

The processing unit 110 may receive and process data associated with components of the engine 20. For example, if the data collection 102 is an image capture device, the data may be one or more images of a component of the engine such as the blades 25 that are captured and transmitted by the image capture device of the data collection system 102 via the communication channel 104. The set of images may be sequential in terms of the order in which they are captured by the image capture device 102 (e.g. image one followed by image two, etc.). In other embodiments, the images may be non-sequential with regard to the order in which the images were captured by the image capture device of the data collection system 102. For example, every third image captured may be received by the processing unit 110. In some embodiments, but not all embodiments, the blades 25 may be in motion or rotating in the engine 20. For example, the blades 25 may rotate toward or away from the image capture device of the data collection system 102 when the images are being captured. The images captured may also be of the same blade 25 in different positions in the field of view of the image capture device and/or may be of a plurality of blades 25 in different positions in the field of view. Thus, there may be periodic or semi-periodic motion in the recorded videos of such inspected engine blades 25.

The processing unit 110 may include a processor 112 and a memory component 114. Processor 112 may execute a program or process to automatically process data collected by the data collection device 102. For example, the processor may collect and process the images captured upon receiving the images using programs stored in memory component 114 to determine whether there are any defects or potential defects within any of the blades 25, and whether there are any changes/propagations of defects from previous inspections. The resulting data may include information about the type of defect, the location of the defect, size of the defect, etc. and, as noted above, may be stored in the database 120. The processor 112 may be a microprocessor or other processor or logic device. In some embodiments, the processor 112 may execute instructions and generate control signals for controlling the data collection device 102 and processing the data collected and/or storage or retrieval of information from database 120. The processor 112 may also execute instructions and generate control signals for causing reporting of results 116 or display on a user interface 130. Such processor 112 instructions that are capable of being executed by a processing unit 110 may be read into or embodied on a computer readable medium, such as the memory component 114 or provided external to the processor 112. In alternative embodiments, hard wired circuitry may be used in place of, or in combination with, software instructions to implement a control method. The term "computer readable medium" as used herein refers to any non-transitory medium or combination of media that participates in providing instructions to the processor 112 for execution. Such a medium may comprise all computer readable media except for a transitory, propagating signal. Forms of computer-readable media may include any medium from which a computer processor 112 can read. The processing unit 110 is not limited to one processor 112 and memory component 114. The processing unit 110 may be several processors 112 and memory components 114. In an alternative embodiment, memory component 114 may be located remote from processing unit 112 and operably interconnected with the processing unit 110. In some embodiments, the data collection system 102 may also be configured to capture data through another communication channel 104 to the database 120 for storage of the raw data e.g., unprocessed images or videos.

As is known in the art, the safe life prediction for a blade 25 is a statistical model and/or a physics-based model that, with the predicted usage, allow extrapolation of the remaining defect-free life of a part. These models may include, for instance, the operating environment, usage stresses, expected maintenance, known defect propagation, and safety requirements. The statistical models, for instance, might be Bayesian, Extreme Value (Weibull, Gumbel, Frechet), or others. The maintenance data may be stored on the database 20. While the embodiments herein have been described with respect to the particular engine component being a blade 25, it should be understood and appreciated that the description is merely illustrative and an example. While blades 25 are common and conventional candidate for maintenance, and inspection, any engine component could be employed with similar consideration. One or more maintenance systems 140 may be in communication with the database 120 via a communication channel 104. The maintenance system 140 may be configured to transmit (to the database 120) maintenance data related to or associated with the engine 20 or more particularly a particular component of the engine 20. For example if the data collection system 102 is collecting data associated with a particular component, such as a blade 25, the maintenance system 130 may provide data associated with the particular blade 25 under inspection. Such maintenance data may include maintenance data related to: the individual blade 25 under inspection or like blades 25, the blade 25 model, the stage of the engine 20 (or in similar engines 20), other stages in the engine 20 (or in other similar engines 20), the engine 20 or other similar engines 20 (same or different model) that utilize the same or similar blades 25, the fleet 50 in which the engine 20 is disposed or other fleets 50 utilizing the same or similar engines 20. The maintenance data may further include, but is not limited to, previous failures or defects identified for a blade 25, identification of statistically abnormal quantities of failures of one or more types of blades 25 in a given engine 20, fleet 50 of like engines 20, engines 20 from a given supplier, blades 25 of a given material or manufacturing lot number (the lot number generally enables tracing of the constituent parts as well as labor and equipment records involved.

Continuing with FIG. 2, component usage data related to a particular engine component, e.g. blade 25 under inspection may be transmitted to/from the database 120 from one or more usage system(s) 140 via a communication channel 104. In some embodiments, the usage system 140 may be a part of the maintenance system 30, or other system. Usage data may include, but is not limited to, the tachometer hours on the engine 20, data indicative of characteristics of how the engine 20 is operated. For example, whether the engine 20 is used in long haul flights or short haul, data on the operating environment (e.g., ambient temperature, presence of particulates in the air such as sand, and the like). As with the other data, usage data may be stored on the database 120 and provided to or retrieved by the processing unit 110 as needed for methods and algorithms executed therein.

Manufacturing data related to a particular engine component, e.g., blade 25 under inspection may be transmitted to the database 120 for storage via a communication channel 12. Such manufacturing data may be transmitted by a manufacturing system 150. Such manufacturing data for a given engine component may include, but is not limited to, Computer-Aided Design (CAD) models, the bill of material, the material batch, the material processing of the engine component, suppliers of the component, the manufacturing date, and the like. Manufacturing data may be stored on the database 20 and provided to or retrieved by the processing unit 110 as needed for methods and algorithms executed therein.

The communication channel(s) 104 may be an optical channel or alternatively, may be any other wired, wireless or radio channel or any other type of channel capable of transmitting images, videos or data between two points including links involving the World Wide Web (www) or the internet.

Results (e.g., the defects, failures, or potential defects) 116 of automated analysis performed or data gathered on some or all of the above data stored in the database 120 may then be reported through communication channel 104 and stored on the database 120. In some embodiments, the results 116 may be displayed on a user interface 130. In an embodiment, a user interface 130 may be configured to receive user input that accepts or rejects the displayed defect or potential defect. Reporting of the results 116 may involve storing the results in the database 120 for future reference, as well as displaying the results on the user interface 130 or raising alarms or alerts when defects are detected.

Figure 3:
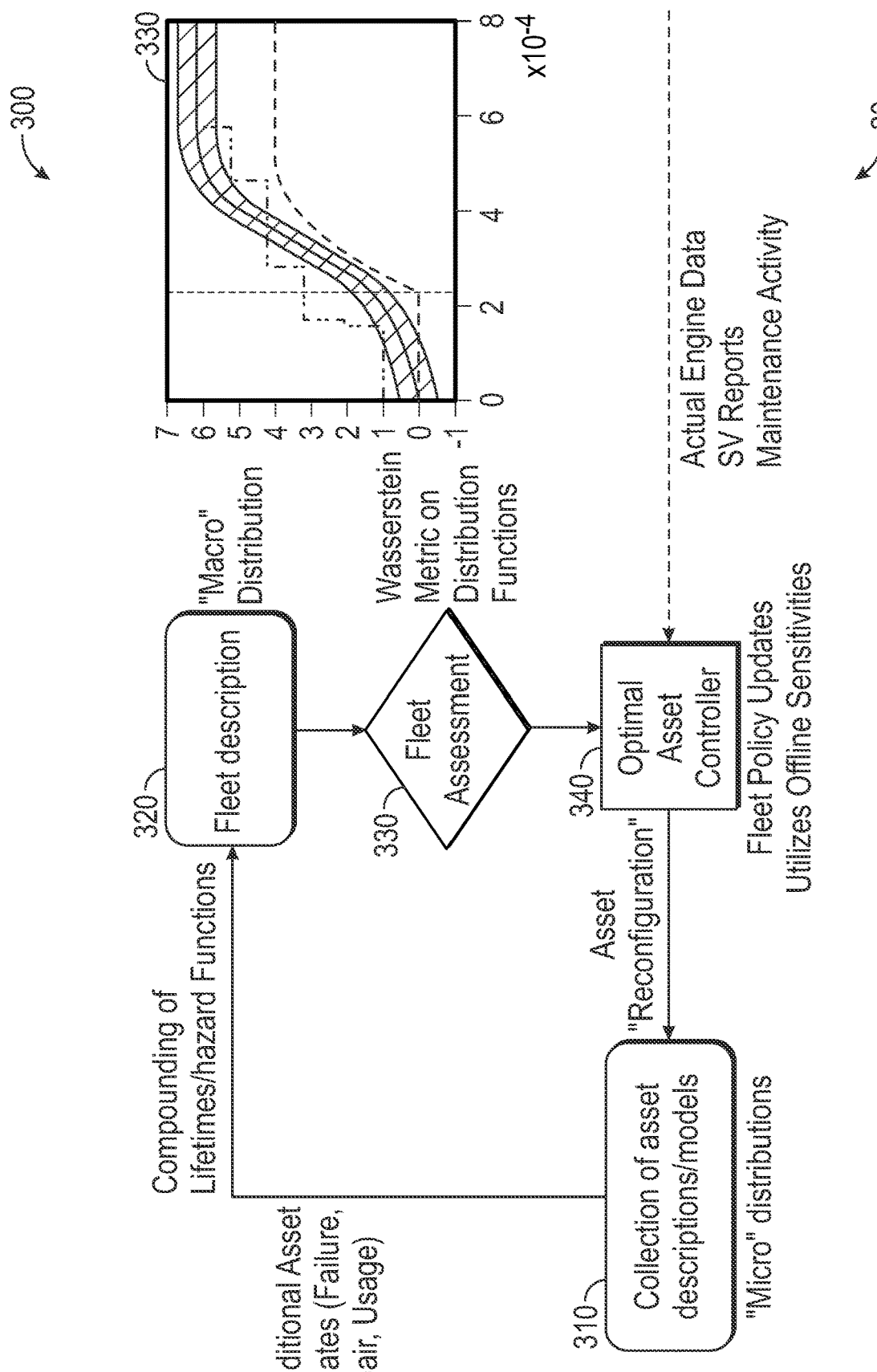
FIG. 3 is a high level flowchart illustrating exemplary steps of a method of providing customizable service for an asset in accordance with an embodiment.
Figure 4A:
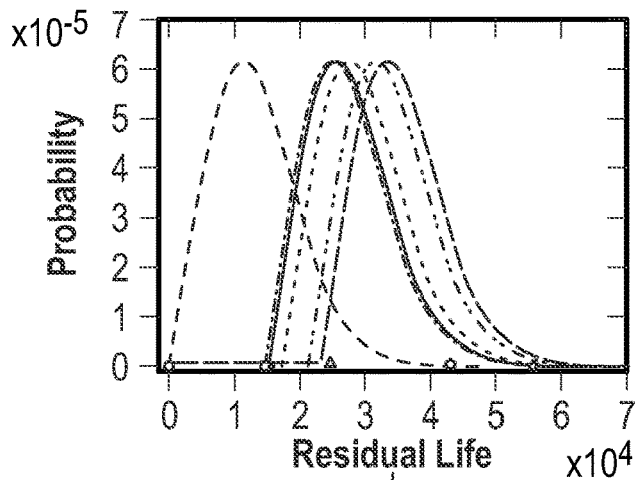
FIG. 4A depicts an illustrative example of a set of probability density functions in accordance with an embodiment.

FIG. 3 is a flowchart depicting a high level flow chart of the methodology 300 performing automated service policy tracking with a fleet level maintenance and diagnostic system 100. In an embodiment, the process is initiated at process block 310 with collection of asset descriptions and models. The descriptions include any information on a given component of the engine 20. For example blade 25 on a given engine 20 as described earlier. The data may include information regarding failure rates, usage, repairs and the like. In one embodiment, the data includes a plurality of probability density functions associated with when a given component and/or engine 20 can be expected to experience a failure, repair, maintenance action and the like. For each of the assets identified, asset models are established to predict failure rates or product life. This data may be collected and established in advance and independently (e.g., offline). FIG. 4A depicts an example of a plurality of residual life probability density functions for an asset, e.g. an engine, engine component such as a blade 25. In an embodiment, while a single failure distribution is depicted per engine for simplicity, it should be appreciated the multiple distributions associated with multiple components across a system such as the engine 20 may be employed.

Figure 4B:
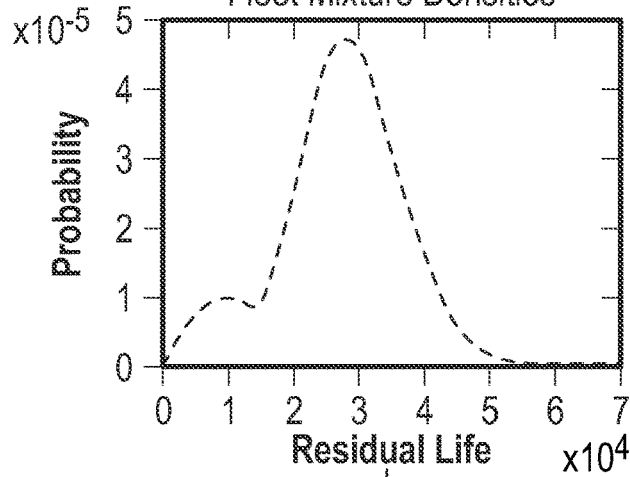
FIG. 4B depicts an illustrative example of a compounded probability density function in accordance with an embodiment.
Figure 4C:
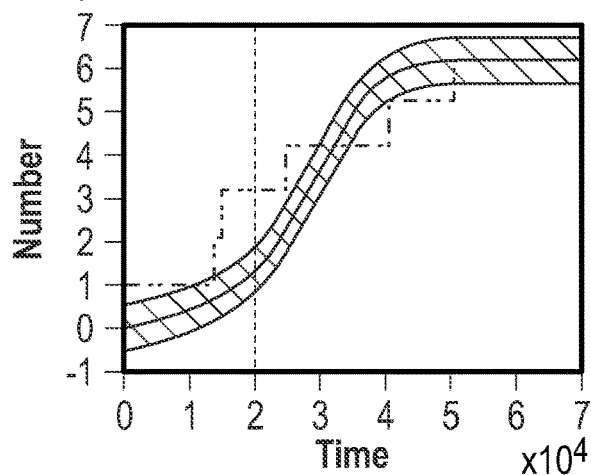
FIG. 4C depicts an illustrative example of a cumulative distribution of expected asset failures over time in accordance with an embodiment.

Continuing with FIG. 3, at process block 320 the individual residual life probability distributions are combined and compounded to establish a fleet level probability distribution predicting risk profiles for the fleet as a whole, e.g., the probability that at a given point in time the fleet has a certain number of healthy assets e.g., engine 20, or an engine component such as blade 25, and the like, vs. assets that require maintenance FIG. 4B depicts an example and graphical depiction of a compounded probability density function combining the individual functions as depicted in FIG. 4A The cumulative distribution function (CDF) of the compounded individual asset residual life probability distribution functions provides expected numbers of failures of assets as a function of time. FIG. 4C depicts an example and graphical depiction of a cumulative density function.

Continuing with FIG. 3, at process step 330 an overall fleet assessment is made to compare the expected number of failures calculated by process step 320 to the actual number of failures. Finally, at process step 340 updates are provided based on actual shop visits, engine data and maintenance activities (e.g., actual repairs and replacements of components since the last invocation of the high-level process in FIG. 3). These updates, together with the difference between actuals and predictions from the assessment in step 330, guide the decision making in step 340 where the asset controller decides between updating the maintenance frequency, changing assignment of engines to missions (short versus long cycle flights) or adjusting the spare delivery schedule. The results of this optimization are asset reconfigurations that are used to update the asset models depicted in process block 310. The process reiterates with updated and refined probability distributions for the various assets.

During online execution, that is, the automated service policy tracking method operating with fleet level maintenance and diagnostic system 100 is receiving updates, and iterates. The projected asset models (residual life probability distributions of FIG. 4A are updated on the basis of actual measurements as was shown in process step 340. For example, assets, e.g., engines 20, or engine components that fail, or are subject to repair (with reset and updated residual life probability distributions associated with the repair action) while non-failing assets have their residual life PDFs conditionally updated (redistribution of probability mass). Fleet level health is updated by compounding the updated individual asset residual life distributions once again, based on the updated individual probability distributions to form a new compounded fleet level distribution, and so on.

Returning to process step 330, this step calculates the Wasserstein (earth-movers) distance between the predicted CDF of fleet residual life vs. the actual CDF (updated-to-current-time, e.g., with updates applied to the asset distributions), is employed to characterize the deviation of actual fleet level performance from that anticipated in the original offline prediction during the fleet assessment step depicted in FIG. 4C. Deviations from original projections above a prescribed threshold in the Wasserstein metric trigger the "optimal asset controller" to re-plan. The replanning/reconfiguration consists of adapting asset level strategies (e.g., of usage and repair) to achieve an updated fleet level risk profile (and revised residual life cumulative distribution function) that meet the desired (e.g., contractual) requirements. This adaptation takes the form of an optimization process that is guided by sensitivities computed offline to capture the effects of various asset-level changes on fleet-level profiles. For example, such sensitivities may include, but not be limited to the sensitivity of the hazard rate to the type of maintenance/repair action taken. Another might be, the sensitivity of the fleet level CDF to the number of spare engines employed, and the like. The selection of an optimal asset strategy amounts to selecting an appropriate performance measure (objective function), identifying variables on which this measure depends and minimizing the measure over the time interval.

In operation with a fleet of assets e.g. engines 20, once a fleet-level maintenance contract has been designed/established, the individual probability distributions are identified on the basis of asset-level reliability projections over service life and sensitivities of fleet health. These projections are made with respect to operating parameters of asset e.g. an engine's operational envelope incorporating, for example, the effects of operational usage profiles and repair event, (the offline or a priori assessment). Subsequently, the "online" phase entails tracking/adhering to the terms of the contract once an asset enters operational service. That is, initially, the assets may not have even seen service. Once the assets enter service, actual usage data, failures, maintenance action are available and the data is applied to update the individual probability density functions and there by the fleet. The method 300 as described above provides a systematic approach for then adapting the asset-in-fleet usage patterns, repair schedules and level of repair once "online" service commences and unexpected failures or actions occur that deviate from the original "offline" predictions.

Figure 5:
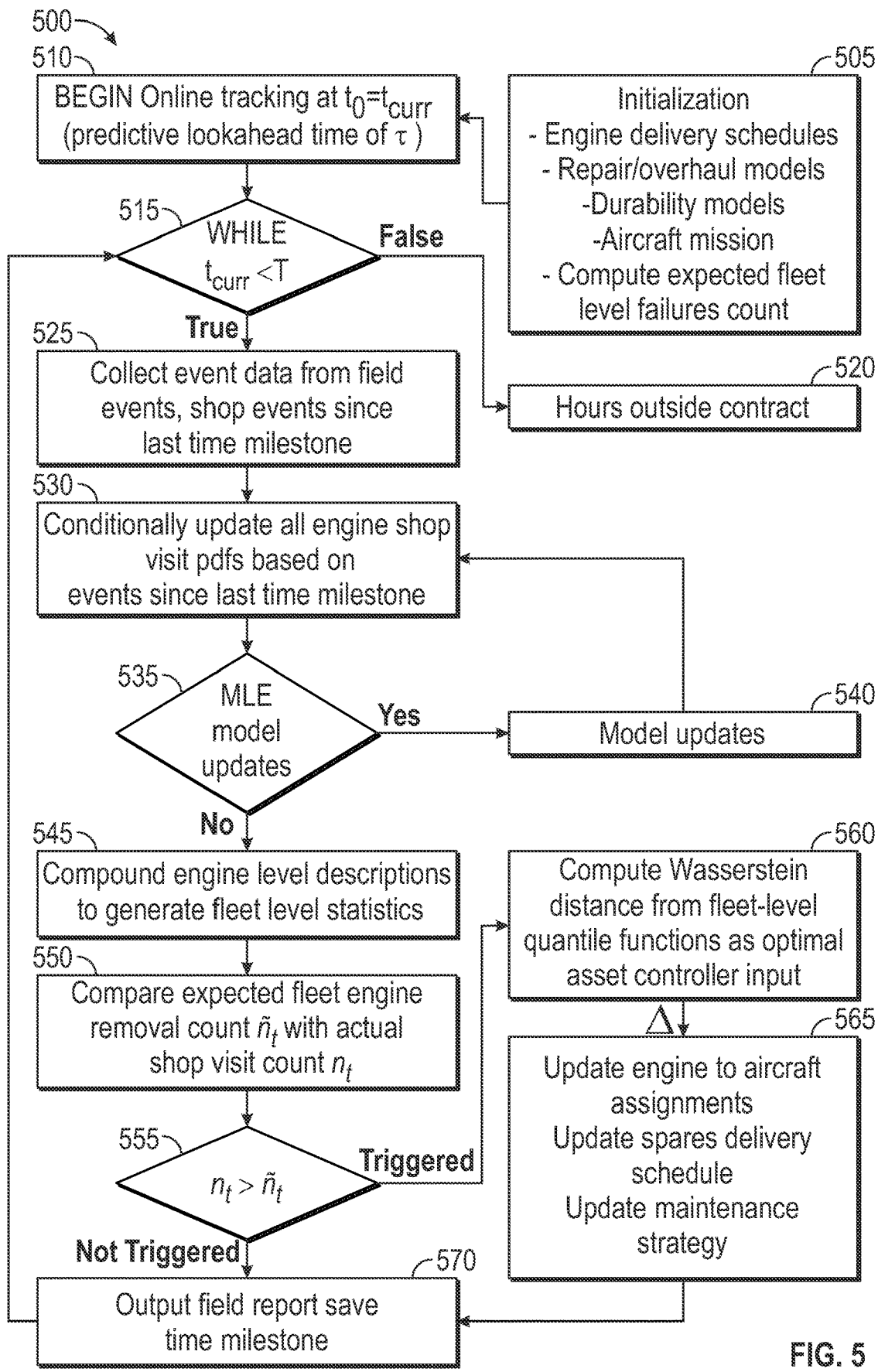
FIG. 5 is a high level flowchart illustrating exemplary steps of a method of providing customizable service for an asset in accordance with an embodiment.

FIG. 5 depicts a more detailed flow chart of the methodology 500 performing automated service policy tracking with a fleet level maintenance and diagnostic system 100 in accordance with an embodiment. In an embodiment, the process is initiated at process block 505 with collection of asset descriptions and models which include delivery dates for assets, durability and remaining useful life probability distributions for assets e.g., engines 20 based on mission allocation, repair/overhaul effect on shop visit hazard rate, and the like. This information permits a calculation of the expected number of engine removals or failures as a function of time (flight hours) over the prediction interval $[t_{curr}, t_{curr}+\tau]$. The prediction interval extends from the current time $t_{curr}$ up to $\tau$ time units into the future.

The descriptions also include any information on a given component of the engine 20. For example blade 25 on a given engine 20 as described earlier. The data may include information regarding failure rates, usage, repairs and the like. As stated above, in an embodiment, the models include a plurality of PDFs associated with when a given component and/or engine 20 can be expected to experience a failure, repair, maintenance action and the like. In an embodiment a Weibull probability density function is used. As stated earlier the initialization, model formation and data collection can be implemented a priori/"off line."

For example, in an embodiment, the 2-parameter Weibull probability density function (PDF) with scale parameter a and shape parameter b is given by $$f(x; a, b) = \begin{cases} \frac{b}{a} \left(\frac{x}{a}\right)^{b-1} e^{-(x/a)^b} & \text{for } x \geq 0 \\ 0 & \text{for } x < 0 \end{cases},$$

with cumulative distribution function (CDF) given by $$\begin{cases} 1 - e^{-(x/a)^b} & \text{for } x \geq 0, \\ 0 & \text{for } x < 0 \end{cases}.$$

At process step 510 "online" operation of the methodology begins with tracking the condition of assets, e.g. engines 20 and how the current conditions compare with predicted conditions for the assets computed and modeled in step 505 before entry-into-service (EIS) and operation of the assets, e.g., engines 20. The PDF characterizing the probability of an engine removal may be of Weibull form. However other probability distribution functions are possible. The current time in the selected duration is evaluated at process step 515, and if the duration has elapsed a notification is provided that the asset is outside the contracted flight duration (i.e., time period within which engines are covered under a fleet management contract), in which case policy tracking terminates as depicted at block 520.

Continuing with the methodology 500 at process block 525 a queue is populated with all events that have occurred since the last time milestone (in the first iteration, these are all the events since an engine went into service); this is the step when information is injected into decision making loop. Events include any shop visits that occurred and any maintenance actions taken at these visits, and other directives. The new data and events are then employed to update the shop visit probability functions.

For example, the translated Weibull distribution (3-parameter Weibull) has the following PDF $$f(x; a, b, \theta) = \begin{cases} \dfrac{b}{a}\left(\dfrac{x-\theta}{a}\right)^{b-1} e^{-\left(\frac{x-\theta}{a}\right)^b} & \text{for } x \geq \theta, \\ 0 & \text{for } x < \theta \end{cases}$$

with the following reliability (survivor function)

$$S(x) = e^{-\left(\frac{x-\theta}{a}\right)^b}$$

where parameter $\theta$ in this distribution corresponds to the entry-into-service time.

Given the events A and B (with P(A)>0) the conditional probability of B given A is defined as $$P(B \mid A) = \frac{P(A, B)}{P(A)}.$$

In the current setting, with A being the event that an engine has survived (remained on-wing) up to time T and B the event that this engine will have a shop visit at some later time t* (>T), this formula permits a conditional update to shop visit predictions at the current time if no shop visits have occurred.

The survivor function (1 minus the CDF) of a conditional Weibull distribution of the time to failure (shop visit) among engines that have reached an age t' is given by $$S(t|t')=\exp[(t'/a)^b-(t/a)^b].$$

From the above expression it may be deduced that the conditional PDF for the time to failure (shop visit) of an engine that has already reached an age t' is given by $$f(t \mid t') = -\frac{d}{dt}\exp\left[(t'/a)^b - (t/a)^b\right] =$$
$$\exp(t'/a)^b \exp\left[-(t/a)^b\right]\left(\frac{b}{a}\right)(t/a)^{b-1} = \exp(t'/a)^b f(t)$$

which provides the "conditioning update" at a given time.

Turning to process step 535, in one embodiment, a Weibull Maximum Likelihood Estimation (MLE) is implemented. For example, if a sufficient amount of new data has been obtained since engine entry-into-service then a maximum likelihood estimation is used to update the shop visit durability models, the models of effect of different levels of repair/maintenance on effective age of the engines etc.

For example, in an embodiment, when an asset, e.g., engine 20 repair or maintenance event occurs it may affect (reduce) the time to the next shop visit (i.e., subsequent survival time) relative to that expected for an "as-new" engine. Therefore the effect of a particular maintenance action on the engine using an accelerated life model may be represented such that:

$$S_{Repaired}(\alpha t)=S_{new}(t)$$

where $0<\alpha<1$; so if $\alpha=0.5$ the probability of survival of a repaired engine at, say, 1000 flight hours matches the probability of survival of a new engine at 2000 flight hours i.e. it ages at twice the rate. Corresponding expressions for the effect of repair on the PDF, CDF, and hazard function may be readily derived. In general a different value of a may be associated with different repair or maintenance actions e.g. costlier overhauls have a higher $\alpha$ value (the engine ages similarly to a new engine).

If model updates are required based on the assessment at 535 (e.g., enough "online" data has been acquired since entry into service of engines), the methodology iterates to incorporate the updated models of durability and repair/maintenance as depicted at process step 540. It should be appreciated that initially the asset PDF models are based on historical data on similar engines but such models can and are refined as the engines in current fleet are flown and usage, failure and repair data are amassed.

At process block 545, possibly following an update of the PDFs, the revised PDFs are integrated and compounded over all engines to compute the expected number of engine removals over the time interval $[t_{curr}, t_{curr}+\tau]$. The expected number of engine removals $\tilde{n}_t$ is compared with the actual number of removals $n_t$ at $t_{curr}$ as depicted at process step 550. At decision block 555, if the actual number of engine removals exceeds the expected number i.e., $n_t > \tilde{n}_t$ then a policy update is triggered and the process repeats.

The policy update requires a more detailed measure of the difference between predicted and actual behavior, which is computed using the Wasserstein distance between quantile functions as depicted at process block 560. The output of this block $\Delta$ represents this difference.

For example in the case of the univariate random variables that we consider here the p-Wasserstein distance between two probability measures P and Q is $$W_p^p(P, Q) = \int_0^1 |F^{-1}(t) - G^{-1}(t)|^p \, dt$$

where $F^{-1}(t)$ and $G^{-1}(t)$ are the quantile functions (inverse cumulative distribution functions) of the probability measures P and Q. The $\infty$-Wasserstein distance is given by $$W_p^p(P,Q)=\|F^{-1}-G^{-1}\|$$

Continuing with process block 565, based on the magnitude of the optimal asset controller input $\Delta$ (difference between predicted and actual behavior) the replanning options available to this decision making block differ. For small $\Delta$ the available options may be limited to updates in the maintenance scheduling frequency and the assignment of engines to missions (short versus long cycle flights). For larger values of $\Delta$ the options set might include the adjustment of the spare delivery schedule. The selection of an optimal strategy may be summarized as selecting an appropriate performance measure (an objective function), identifying the available variables on which this measure depends (from enabled options set based on the value of the error $\Delta$) and reducing or minimizing the metric over the time interval $[t_{curr}, t_{curr}+\tau]$.

An optional field report may be generated as depicted at process block 570 that records any adjustments to delivery schedules, maintenance policies etc. made in block 565. In an embodiment, a current timestamp is also recorded as a time milestone so that any events occurring since this milestone can be tracked/retracked at 515 on the next pass as the process iterates.

Returning to decision block 555, if the actual number of engine removals is less than the expected number i.e., $n_t < \tilde{n}_t$ then the method reiterates, once again transitioning to process block 570 to generate an optional report.

Advantageously, the described embodiments have the technical benefits of providing a system level approach to address the problem of distribution and allocation of gas turbine engines to customer engine fleets. In an embodiment the methodology mathematically represents stochastic gas turbine engine hot-section durabilities, engine delivery schedules, and customer priorities; to derive an engine demand indicator varying in time to assist decision makers. Moreover, optimal engine delivery, repair, overhaul, and maintenance (collectively referred to as service) protocols are designed to achieve a desired fleet performance using a generalized sensitivity analysis that compounds projections from individual, engine-level, remaining useful life models. Adaptation-in-time of these service protocols is accomplished by incorporating measurements of actual engine performance and maintenance data (available once entry into service has begun) and revising future projections.

In terms of hardware architecture, a computing device or processing unit 110 can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

When the processing unit 110 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set), or generally any device for executing software.

The memory e.g., 112, 114 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, such as a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance, but not limited to, a modulator/demodulator (modem; for accessing another device, system, or network), a radio frequency (RF) or other transceiver, a telephonic interface, a bridge, a router, etc.

One should note that the FIGS. 2, 3, and 5 show the architecture, functionality, and/or operation of a possible implementation of software. In this regard, one or more of the blocks can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of customizable service for an asset, the method comprising:
generating a predictive model for each asset of a plurality of assets forming a fleet, each predictive model based on an operational profile for the asset, the predictive model including a probability density function associated with the operational durability of the asset, wherein the asset includes a gas turbine engine;
establishing a maintenance strategy associated with at least one asset associated with the fleet, the maintenance strategy including user defined metrics;
combining each of the predictive models to generate a predicted compound fleet performance model, the fleet performance model including a combined probability density function;
generating, via at least one sensor, evaluation data of an asset of the plurality of assets, the evaluation data including an image of the gas turbine engine;
receiving, via a computer processor, the image included with the evaluation data from the at least one sensor, and determining actual asset performance and maintenance data for the at least one asset of the plurality of assets based on the image included in the evaluation data to generate actual asset metrics;
determining, by a computer processor, a fleet performance profile based on the actual asset metrics indicative of a health assessment of the fleet;
comparing, by the computer processor, the predicted fleet performance profile with the actual fleet performance profile and determining if an actual failure rate exceeds an expected failure rate; and
ascertaining actionable choices for managing the assets in response to the actual failure rate exceeding the expected failure rate based on a deviation of the predicted fleet performance profile and the actual fleet performance profile; and
updating the predictive models based on the deviation, wherein the actionable choices are based on computing the deviation of fleet level actual failure data from predictions,
wherein the deviation of the actionable choices are based on a deviation ($\Delta$) of the actual fleet performance profile from the predicted fleet performance profile and wherein the predictive models are updated based on the deviation ($\Delta$),
wherein updating the predictive models based on the deviation includes the computer processor updates in maintenance scheduling frequency and the assignment of assets to missions in response to the deviation ($\Delta$) being a first deviation value, and
wherein the computer processor adjusts a spare delivery schedule of the assets in response to the deviation ($\Delta$) being a second deviation value that is larger than the first deviation.

2. The method of claim 1, wherein the predictive model is based on a Weibull distribution.

3. The method of claim 1, wherein the predictive model is based on at least one of delivery schedules, repair models, overhaul models, mission data.

4. The method of claim 1, wherein the combining includes an integration of each probability density function associated with the fleet.

5. The method of claim 1, wherein the determining includes updating the predictive models for the assets of the fleet based on the collected performance and maintenance data.

6. The method of claim 1, wherein the at least one sensor is configured to detect infrared or millimeter wave frequencies to generate the image of one or both of the gas turbine engine and a component of the gas turbine engine, and wherein the actual asset performance and maintenance data includes at least one of actual failure data, actual repair rates associated with selected assets in the fleet.

7. The method of claim 1, wherein the comparing is based on determining if an actual failure rate exceeds an expected or predicted failure rate.

8. The method of claim 1, wherein:
the actionable choices are based on computing a deviation of fleet level actual failure data from predictions and updating the predictive models based on the deviation;
the actionable choices are based on a deviation ($\Delta$) of the actual fleet performance profile from the predicted fleet performance profile and wherein the predictive models are updated based on the deviation ($\Delta$); and
the computer processor updates in maintenance scheduling frequency and the assignment of assets to missions in response to the deviation ($\Delta$) being a first deviation value, and wherein the computer processor adjusts a spare delivery schedule of the assets in response to the deviation ($\Delta$) being a second deviation value that is larger than the first deviation.

9. The method of claim 8, wherein the computing is based on a Wasserstein distance.

10. The method of claim 1, further including adjusting mission profiles for at least one asset based on the actual fleet performance deviation from a predicted fleet performance.

11. The method of claim 1, further including adjusting a maintenance strategy for at least one asset based on an actual fleet performance deviation from a predicted fleet performance.

12. The method of claim 1, further including adjusting a maintenance strategy for at least one asset based on at least one of actual fleet performance and actual asset performance.

13. The method of claim 1, further including updating a predictive model associated with at least one asset of the plurality of assets based on at least one of actual fleet performance and actual asset performance.

14. The method of claim 1, further including reiterating at least the generating, combining, collecting, determining, comparing, and ascertaining for a selected duration.

15. The method of claim 14, wherein the selected duration corresponds to a duration of a maintenance contract.

16. The method of claim 1, wherein the predictive model includes a selected look ahead time.

17. The method of claim 16, wherein the selected look ahead time is less than or equal to a contract duration.

18. The method of claim 1, further including generating a report indicative of at least an actual fleet performance deviation from a predicted fleet performance.

19. The method of claim 1, wherein the asset further includes a component of the gas turbine engine.

20. A maintenance system for providing customizable service for an asset, the system configured to:
generate a predictive model for each asset of a plurality of assets forming a fleet, each predictive model based on an operational profile for the asset, the predictive model including a probability density function associated with the operational durability of the asset, wherein the asset includes a gas turbine engine;

establish a maintenance strategy associated with at least one asset associated with the fleet, the maintenance strategy including user defined metrics;

combine each of the predictive models to generate a predicted compound fleet performance model, the fleet performance model including a combined probability density function;

generating, via at least one sensor, evaluation data of an asset of the plurality of assets, the evaluation data including an image of one or both of the gas turbine engine and the component of the gas turbine engine;

receiving, via a computer processor, the image included with the evaluation data from the at least one sensor, and determining, via the computer processor, actual asset performance and maintenance data for the at least one asset of the plurality of assets based on the image included in the evaluation data to generate actual asset metrics;

determine a fleet performance profile based on the actual asset metrics indicative of a health assessment of the fleet, compare the predicted fleet performance profile with the actual fleet performance profile and determine if an actual failure rate exceeds an expected failure rate, and ascertain actionable choices for managing the assets in response to the actual failure rate exceeding the expected failure rate, wherein ascertaining the actionable choices are based on a deviation of the actual fleet performance profile from the predicted fleet performance profile and updating the predictive models based on the deviation ($\Delta$), and wherein the computer processor updates in maintenance scheduling frequency and the assignment of assets to missions in response to the deviation ($\Delta$) being a first deviation value, and wherein the computer processor adjusts a spare delivery schedule of the assets in response to the deviation ($\Delta$) being a second deviation value that is larger than the first deviation.

* * * * *